Jan. 4, 1966 R. E. COLLIS 3,228,000

ARRANGEMENTS FOR DETECTING SIGNAL TRANSMISSION ERRORS
IN TELEGRAPH AND LIKE SYSTEMS

Filed Oct. 29, 1962 4 Sheets-Sheet 1

United States Patent Office 3,228,000
Patented Jan. 4, 1966

3,228,000

ARRANGEMENTS FOR DETECTING SIGNAL TRANSMISSION ERRORS IN TELEGRAPH AND LIKE SYSTEMS

Reginald Edward Collis, Wilmington, Dartford, England, assignor to Associated Electrical Industries Limited, London, S.W. 1, England, a British company
Filed Oct. 29, 1962, Ser. No. 233,637
Claims priority, application Great Britain, Nov. 10, 1961, 40,355/61
1 Claim. (Cl. 340—146.1)

Figure 1A:
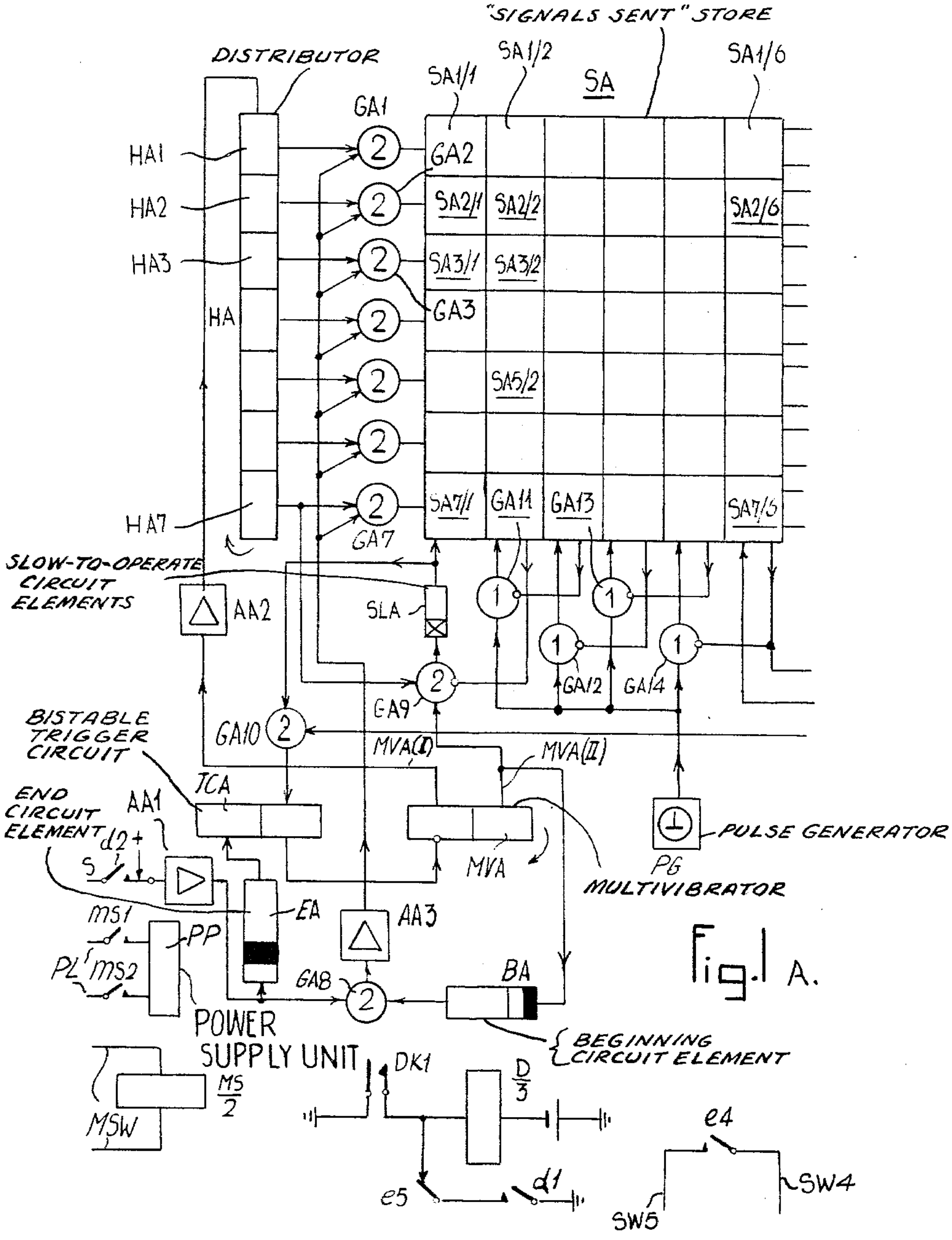

This invention relates to arrangements for detecting signal transmission errors in telegraph and like systems, and more particularly to arrangements for detecting such errors in telegraph and like systems employing multi-element signals of the kind in which the elements occur successively and involve, at least so far as code elements thereof are concerned, only two signalling conditions (e.g. a "spacing" condition and a "marking" condition).

The kind of error-detecting arrangement with which the invention is concerned is one which in use is connected to receive, in respect of a signal transmission channel of a telegraph or like system employing multi-element signals of the kind referred to, multi-element signals that correspond to the signals sent over this channel from a transmitting point at which the error-detecting arrangement is situated and multi-element signals that are, at this transmitting point, received back from a distant receiving point and that ought, in the absence of error in signal transmission, to be identical, so far as signal signficance is concerned, with the respective corresponding ones of the signals sent over said channel from said transmitting point, and which is adapted to compare the multi-element signals received back from the distant receiving point with the respective corresponding ones of said multi-element signals that correspond to the signals sent over said channel from said transmitting point and to detect any lack of identity of compared signals.

In general, in the case of an error-detecting arrangement of the kind referred to, delays due to the transmission characteristics of the signal transmission channels concerned and of any signal repeating and such like apparatus concerned cause the multi-element signals that the error-detecting arrangement receives back from the distant receiving point to be delayed in relation to the respective corresponding ones of the multi-element signals that the error-detecting arrangement receives that correspond to the signals sent from the transmitting point. Depending on the transmission characteristics referred to, the delay period concerned may be nearly zero (less than 5 milliseconds) or relatively high (for example up to 600 milliseconds). It follows that an error-detecting arrangement of the kind referred to has in general to be provided with means for storing, for periods sufficient to provide for the comparison of relevant corresponding signals, the multi-element signals that correspond to the signals sent from the transmitting point.

A main object of the present invention is to provide an error-detecting arrangement of the kind referred to which is inherently suitable for use in differing circumstances involving a wide range of delay periods as referred to (for example a range of from substantially zero up to 600 milliseconds) and does not require manual adjustment to adapt it to meet the particular circumstances, as regards the pertinent such delay period in this wide range, in which it is used.

The invention has especially in view the provision of an improved error-detecting arrangement of the kind referred to for use with 50-baud telegraph circuits such as are used in teleprinter networks.

According to a main feature of the invention, an error-detecting arrangement of the kind referred to includes a "signal sent" store in the form of a chain type pattern store, and is arranged so that the elements constituting a multi-element signal corresponding to a signal sent from the transmitting point are inserted as a pattern into this store at one end thereof, and are then in effect progressed as a whole along this store to the other end thereof where they are stored while the requisite comparison between the elements of the corresponding multi-element signal received back from the distant receiving point and them is effected, and are finally removed from storage, the nature of the "signals sent" store and the arrangements for its use and control being such that it provides for the formation, as and when necessary, of what is in effect a queue of stored multi-element signals awaiting comparison with respective corresponding signals received back from the distant receiving point.

Figure 1B:
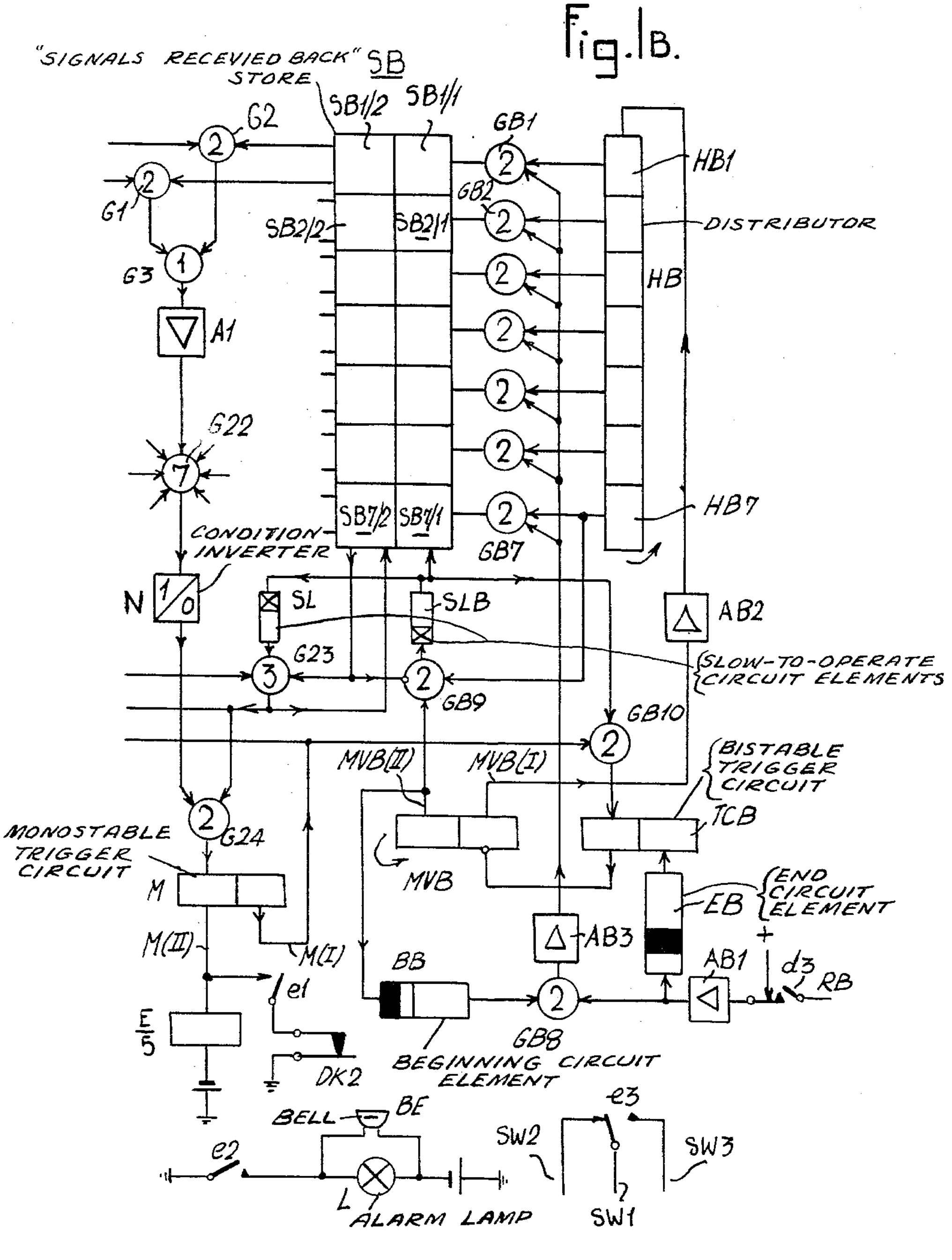

The nature of the invention will be more clearly understood from the description of a specific error-detecting unit in accordance with the invention, and adapted for use in a telegraph system employing seven-element signals, which will now be given with reference to the accompanying drawings. FIGS. 1A and 1B of the drawings, when placed side by side with FIG. 1B to the right of FIG. 1A, together constitute a diagram (partly a circuit diagram but largely a schematic diagram of the so-called functional type) showing the general constitution and organisation of the error-detecting unit concerned. FIGS. 2 to 6 inclusive illustrate the forms which certain elements shown in FIGS. 1A and 1B may take.

The unit includes a "signals sent" store SA comprising seven storage chains each comprising six bistable trigger circuits, and a "signals received back" store SB comprising seven storage chains each comprising only two bistable trigger circuits. In the diagrammatic representation of these stores that is employed in the diagram constituted by FIGS. 1A and 1B, each small rectangle represents a bistable trigger circuit, and a horizontal row of these small rectangles represents a storage chain. Hereinafter, a bistable trigger circuit will be referred to as being "unset" when in a normal (or "unset") one of its two stable conditions, and as being "set" when in the other (or "set") one of these two conditions. By reason of the manner in which telegraph code signals are entered into storage in the stores SA and SB, in the case of each of these stores the top (as seen in the diagram) storage chain in the store should be considered as being, and will be referred to as, the first storage chain of the store, the next lower storage chain in the store should be considered as being, and will be referred to as, the second storage chain of the store, and so on. Referring to the storage chains in this way, the "signals sent" store SA comprises a first storage chain having a first bistable trigger circuit SA1/1, a second bistable trigger circuit SA1/2, and a sixth or last bistable trigger circuit SA1/6, and a second storage chain having a first bistable trigger circuit SA2/1 and a sixth or last bistable trigger circuit SA2/6, and so on, the seventh or last storage chain of the store having a first bistable trigger circuit SA7/1 and a sixth or last bistable trigger circuit SA7/6. The "signals received back" store SB comprises a first storage chain having a first bistable trigger circuit SB1/1 and a second bistable trigger circuit SB1/2, and a second storage chain having a first bistable trigger circuit SB2/1 and a second bistable trigger circuit SB2/2, and so on, the seventh or last storage chain of the store having a first bistable trigger circuit SB7/1 and a second bistable trigger circuit SB7/2. In the case of each of the stores SA and SB, the seven storage chains of the store correspond respectively to the seven successive signal elements involved in a signal in the form of telegraph code concerned. These seven signal elements are a "start" element having a nominal duration of 20 milliseconds, five "code" or information elements each having a nominal duration of 20 milliseconds, and a "stop" element having a duration of at least 30 milliseconds. Each of the stores SA and SB is arranged and used so that, as regards its constituent bistable trigger circuits, each group of seven bistable trigger circuits obtained by taking one bistable trigger circuit from each storage chain of the store, the bistable trigger circuits concerned being corresponding ones in the responsive chains, constitutes a signal storage unit adapted to store the seven elements involved in a signal. In the diagram constituted by FIGS. 1A and 1B, each such group of seven bistable trigger circuits appears as a vertical column of bistable trigger circuits, and because of this the expression "column of bistable trigger circuits" will, where convenient, be used hereinafter in referring to such a group (constituting a signal storage unit as just mentioned). In the case of each of the stores SA and SB, the registration of a signal in a signal storage unit constituted by a column of bistable trigger circuits involves bringing to the "set" condition relevant ones of the bistable trigger circuits of the column to cause the signal to be registered in the signal storage unit as a pattern of "set" and "unset" bistable trigger circuits.

In the case of the "signals sent" store SA, a signal for storage therein is first registered in a first signal storage unit of the store, this being the signal storage unit that appears on the left in the representation of the store in FIG. 1A, and is then, as part of the normal operation of the error-detecting unit and as a consequence of the repeated transfer of the registration from one signal storage unit of the store to the next succeeding signal storage unit of the store, registered in turn in the remaining, that is second to sixth, signal storage units of the store. The first signal storage unit of store SA is of course the one that includes bistable trigger circuits SA1/1 and SA7/1, and the second signal storage unit of this store is of course the one that includes bistable trigger circuits SA1/2 and SA5/2, and so on, the sixth or last signal storage unit of the store being the one that includes bistable trigger circuits SA1/6 and SA7/6. The transfer of the registration of a stored signal from any of the first to fifth signal storage units of the store SA to the next succeeding signal storage unit of the store results from the feeding of a resetting pulse to each of the seven bistable trigger circuits that constitute the particular signal storage unit from which the registration is to be transferred. Such feeding of a resetting pulse produces the requisite transfer because each storage chain of the store SA is arranged so that, as regards each bistable trigger circuit in the chain except the last in the chain, the resetting of a bistable trigger circuit from its "set" to its "unset" condition by a resetting pulse gives rise to the feeding of a setting pulse to the next succeeding bistable trigger circuit in the chain. Gating circuits, represented functionally in the diagram by five gating circuits GA9, GA11, GA12, GA13, and GA14, operate to the end that, as regards each of the six signal storage units of the store SA except the last, a resetting pulse is only fed to the seven bistable trigger circuits of a signal storage unit if the seven bistable trigger circuits of the next succeeding signal storage unit of the store are all in the "unset" condition. In other words, these gating circuits operate to the end that the transfer action in regard to the transfer of signal registrations from signal storage unit to signal storage unit of the store SA is inhibited progressively backwards as what is in effect a queue of registered signals is formed in the store. A pulse generator PG serves for supplying resetting pulses to the second to fifth signal storage units of the store SA. The signals that correspond to the relevant telegraph signals sent from the transmitting point concerned, and that constitute the signals to be registered and stored in the "signals sent" store SA, are received by the error-detecting unit over a "signals sent" input wire S. On this input wire, the "start" element of a signal is received as a positive-going element, a "spacing" element of a signal is received as a positive-going element, a "marking" element of a signal is received as a negative-going element, and the "stop" element of a signal is received as a negative-going element. The apparatus involved in the registration, in the store SA, of a signal received over wire S, and in the subsequent preparation of the error-detecting unit for the registration of the next succeeding signal received over wire S, includes three buffer amplifiers AA1, AA2, and AA3, a bistable trigger circuit TCA, a multivibrator MVA, a distributor HA, a so-called beginning circuit element BA, a so-called end circuit element EA, ten gating circuits GA1 to GA7, GA8, GA9 and GA10, and a so-called slow-to-operate circuit element SLA. The distributor HA is constituted by a ring of seven bistable trigger circuits HA1 to HA7 each represented by a small rectangle in the diagram.

In the case of the "signals received back" store SB, a signal for storage therein is first registered in a first signal storage unit of the store, this being the signal storage unit that appears on the right in the representation of the store in FIG. 1B, and is then, as part of the normal operation of the error-detecting unit and as a consequence of the transfer of the registration from the one unit to the other, registered in the remaining, or second, signal storage unit of the store. The first signal storage unit of store SB is of course the one that includes bistable trigger circuits SB1/1 and SB7/1, and the second signal storage unit of this store is of course the one that includes bistable trigger circuits SB1/2 and SB7/2. The transfer of the registration of a stored signal from the first signal storage unit of store SB to the second signal storage unit of this store results from the feeding of a resetting pulse to each of the seven bistable trigger circuits that constitute the first signal storage unit. Such feeding of a resetting pulse produces the requisite transfer because each storage chain of the store SB is arranged so that the resetting of the first bistable trigger circuit in the chain from its "set" to its "unset" condition by a resetting pulse gives rise to the feeding of a setting pulse to the second bistable trigger circuit in the chain. Gating circuits, represented functionally in the diagram by a gating circuit GB9, operate to the end that a resetting pulse is only fed to the seven bistable trigger circuits of the first signal storage unit of the store SB if the seven bistable trigger circuits of the second signal storage unit of this store are all in the "unset" condition. The signals received back from the distant receiving point concerned (for comparison with the respective corresponding signals received by the error-detecting unit over the "signals sent" input wire S), and that constitute the signals to be registered and store in the "signals received back" store SB, are received by the error-detecting unit over a "signals received back" input wire RB. On this input wire RB, the "start" element of a signal is received as a positive-going element, a "spacing" element of a signal is received as a positive-going element, a "marking" element of a signal is received as a negative-going element, and the "stop" element of a signal is received as a negative-going element. The apparatus involved in the registration, in the store SB, of a signal received over wire RB, and in the subsequent preparation of the error-detecting unit for the registration of the next suceeding signal received over wire RB, includes three buffer amplifiers AB1, AB2, and AB3, a bistable trigger circuit TCB, a multivibrator MVB, a distributor HB, a so-called beginning circuit element BB, a so-called end circuit element EB, ten gating circuits GB1 to GB7, GB8, GB9, and GB10, and a so-called slow-to-operate circuit element SLB. The distributor HB is constituted by a ring of seven bistable trigger circuits HB1 to HB7 each represented by a small rectangle in the diagram.

The apparatus involved in the comparison of a signal received by the error-detecting unit over the "signals received back" input wire RB, and registered and stored in the "signals received back" store SB, with the corresponding signal received by the error-detecting unit over the "signals sent" input wire S, and registered and stored in the "signals sent" store SA, includes a coincidence-of-seven gating circuit G22, seven similar input circuit arrangements for this gating circuit G22 (of which only a typical one, comprising gating circuits G1 and G2 and G3 and a buffer amplifier A1, is represented in the diagram), a condition inverter N, a so-called slow-to-operate circuit element SL, two gating circuits G23 and G24, and a monostable trigger circuit M. As will be clear from the diagram, the particular one of the seven similar input circuit arrangements just mentioned that is represented in the diagram pertains to the first storage chains of the stores SA and SB. The remaining six of these seven similar input circuit arrangements pertain respectively to the second to seventh storage chains of these stores.

In addition to the apparatus already mentioned, the error-detecting unit includes three electromagnetic relays MS, D, and E, a power supply unit ("power pack") PP, a so-called "Data" key DK (a non-locking key represented in the diagram by its two contacts DK1 and DK2), an alarm lamp L, and an alarm bell or buzzer BE. The wires PL are alternating current supply leads, and the power supply unit PP is of a suitable known type adapted to derive the requisite direct current power supplies for the error-detecting unit from the alternating current supply afforded over these leads.

Throughout periods in which the telegraph equipment with which the error-detecting unit is associated is in service, relay MS is operated over wires MSW extending from this telegraph equipment. Upon operation, relay MS at its contacts *ms*1 and *ms*2 completes the connection of the power supply unit PP to the alternating current supply leads PL, with the consequence that the power supply unit PP furnishes the requisite direct current power supplies for the error-detecting unit. To bring the error-detecting unit into operation, the connection of the power supply unit PP to the alternating current supply leads PL having already been completed by the operation of relay MS, the "Data" key DK is operated for a brief period. Upon operation, the "Data" key at its make contact DK1 closes an operating circuit for relay D, and this relay on operation locks up over its contact *d*1 in a circuit including contact *e*5. Thereafter, as long as relay MS is maintained operated and the alternating current supply to the leads PL is maintained, and unless and until an error is detected in a signal received back from the distant receiving point concerned and received by the error-detecting unit over the "signals received back" input wire RB, operations as follows take place in the error-detecting unit in respect of relevant telegraph signals sent from the transmitting point concerned. Dealing firstly with what happens in respect of the first such signal to be sent following the operation of relay D, the corresponding first signal received by the error-detecting unit over the "signals sent" input wire S is fed to the amplifier AA1 over operated contact *d*2. The positive-going "start" element of this first signal received over wire S serves to produce, through the medium of the amplifier AA1, the cessation of an effective input condition on one input wire of the gating circuit GA8 and the production (by the functioning of the end circuit element EA) of an effective input condition on a setting input wire of the bistable trigger circuit TCA, which trigger circuit is therefore, at a point of time early in the period of duration of the "start" element, set to its "set" condition in which it no longer inhibits oscillatory operation of the multivibrator MVA. Set into operation as a consequence of this, the multivibrator MVA produces pulses of approximately rectangular wave-form on its output wires MVA(I) and MMVA(II), the pulses on either of these output wires occupying the time intervals between the pulses on the other of these wires. The pulses produced on the output wire MVA(I) are transmitted, through the medium of the amplifier AA2, to a stepping input wire of the distributor HA to serve as stepping pulses for stepping this distributor, and the first of them serves to step this distributor to the condition in which bistable trigger circuit HA1 is in the "set" condition, the normal condition of this distributor being the condition in which bistable trigger circuit HA7 is in the "set" condition. The pulses produced on the output wire MVA(II) of multivibrator MVA are fed to one input wire of the gating circuit GA9 and to the input wire of the beginning circuit element BA, and element BA serves to produce a brief output pulse (e.g. having a duration of the order of 2 milliseconds) upon the beginning of each of them. The first brief output pulse produced by the beginning circuit element BA in the case now being dealt with occurs after the stepping of the distributor HA to the condition in which bistable trigger circuit HA1 is in the "set" condition, but well within the period of duration (nominally 20 milliseconds) of the "start" element of the signal received over wire S. Since it occurs while there is no effective input condition on the left-hand (as shown) input wire of the gating circuit GA8, the first brief output pulse produced by the element BA and just referred to, although fed to the other input wire of the gating circuit GA8, does not cause this gating circuit to produce, through the medium of the amplifier AA3, an effective input condition on one input wire of each of the gating circuits GA1 to GA7. It follows from this that, notwithstanding the fact that at this time the bistable trigger circuit HA1 of distributor HA is in the "set" condition and therefore producing an effective input condition on the remaining input wire of the gating circuit GA1, the gating circuit GA1 does not at this time produce an effective input condition on a setting input wire of the first bistable trigger circuit SA1/1 of the first storage chain of the "signals sent" store SA. The "start" element of the signal received over wire S, being of the same nature as a "spacing" element, is accordingly registered in a negative manner by the fact that at this time the bistable trigger circuit SA1/1 is left in the normal or "unset" condition. The second (in the case now being dealt with) pulse produced on the output wire MVA(I) of the multivibrator MVA serves to step the distributor HA to the condition in which bistable trigger circuit HA2 is in the "set" condition. The second brief output pulse produced by the beginning circuit element BA occurs after this stepping of the distributor HA, but well within the period of duration (nominally 20 milliseconds) of the first of the five "code" or information elements of the signal received over wire S (it being arranged that the period of oscillation of the multivibrator MVA is such as to produce this result). Assuming by way of example that the first "code" or information element concerned is a "spacing" element, this first "code" or information element does not serve to produce an effective input condition on the left-hand (as shown) input wire of the gating circuit GA8, and consequently the second brief output pulse produced by the element BA and just referred to does not cause this gating circuit to produce (through the medium of the amplifier AA3) an effective input condition on the relevant input wires of the gating circuit GA1 to GA7. It follows from this that, notwithstanding the fact that at this time the bistable trigger circuit HA2 of distributor HA is in the "set" condition, the gating circuit GA2 does not at this time produce an effective input condition on a setting input wire of the first bistable trigger circuit SA2/1 of the second storage chain of the "signals sent" store SA. The first "code" or information element concerned, being a "spacing" element, is accordingly registered in a negative manner by the fact that at this time the bistable trigger circuit SA2/1 is left in the normal or "unset" condition. The third (in the case now being dealt with) pulse produced on the output wire MVA(I) of the multivibrator MVA serves to step the distributor HA to the condition in which bistable trigger circuit HA3 is in the "set" condition. The third brief output pulse produced by the beginning circuit element BA occurs after this stepping of the distributor HA, but well within the period of duration (nominally 20 milliseconds) of the second of the five "code" or information elements of the signal received over wire S. Assuming by way of example that the second "code or information element concerned is a "marking" element, this second "code" or information element serves to produce, through the medium of the amplifier AA1, an effective input condition on the left-hand (as shown) input wire of the gating circuit GA8, with the consequence that the third brief output pulse produced by the element BA, and just referred to, causes the gating circuit GA8 to produce, through the medium of the amplifier AA3, an effective input condition on the relevant input wires of the gating circuits GA1 to GA7. This in turn causes, owing to the fact that at this time the bistable trigger circuit HA3 of distributor HA is in the "set" condition, the gating circuit GA3 to produce an effective input condition on a setting input wire of the first bistable trigger circuit SA3/1 of the third storage chain of the "signals sent" store SA. The bistable trigger circuit SA3/1 is accordingly set to the "set" condition to register the second of the five "code" or information elements of the signal received over wire S. The manner in which the remaining four elements of this signal are registered according to their nature will be clear without further description. Of the pulses produced on the output wire MVA(II) of multivibrator MVA during the registration concerned, the particular pulse that causes the beginning circuit element BA to produce the brief output pulse pertaining to the registration of the last or "stop" element of the signal occurs, of course, with the bistable trigger circuit HA7 of distributor HA in the "set" condition. Consequently, this particular pulse produced on the wire MVA(II), as well as causing the beginning circuit element BA to produce the relevant brief output pulse, also causes, after a short delay and through the medium of the apparatus represented functionally by the gating circuit GA9 and the slow-to-operate circuit element SLA, the production of an effective input condition on one input wire of the gating circuit GA10 and the feeding of a resetting pulse to each of the seven bistable trigger circuits SA1/1, SA2/1, . . . , and SA7/1 that constitute the first signal storage unit of the store SA. The consequences of this are that subsequent to the registration of the seven elements of the signal in the first signal storage unit of the store SA, but well within the period of duration (at least 30 milliseconds) of the "stop" element, the gating circuit GA10 produces an effective input condition on a resetting input wire of the bistable trigger circuit TCA, and each of the seven bistable trigger circuits SA1/1 to SA7/1 that has been set to the "set" condition for the purposes of the registration of the signal is reset to its "unset" condition. The gating circuit GA10 produces an effective input condition on the resetting input wire of TCA as just stated by reason of the fact that in the circumstances concerned the monostable trigger circuit M is in its normal or stable condition in which it produces, on its output wire M(I), an effective input condition on a second input wire of the gating circuit GA10. The effective input condition on the resetting input wire of TCA causes, of course, this bistable trigger circuit to be reset to its "unset" condition, and the resetting of the relevant ones of the seven bistable trigger circuits SA1/1 to SA7/1 effects, as will be apparent from the description already given, the transfer of the signal registration from now being dealt with, in which (it has been assumed) the first "code" or information element of the signal now being referred to is a "scaping" element and the first "code" or information element of the S–TE1403 signal now being referred to is a "spacing" element and the second "code" or information element is a "marking" element, such transfer involves, so far as the bistable trigger circuits SA1/2, SA2/2, and SA3/2 of the second signal storage unit of store SA are concerned, the leaving of SA1/2 in the normal or "unset" condition, the leaving of SA2/2 in the normal or "unset" condition, and the setting of SA3/2 to the "set" condition. Further, since (on the assumptions made) the signal now being referred to is the first received by the error-detecting unit over its "signals sent" input wire S following operation of relay D, the transfer of the signal registration from the first signal storage unit of the store SA to the second signal storage unit of this store takes place at a time when there is no earlier signal stored in this store to necessitate inhibition of transfer of the signal to any signal storage unit. Consequently, the transfer of the signal registration to the second signal storage unit is quickly followed by transfer of this registration to the sixth signal storage unit as the result of a rapid transfer of the registration from signal storage unit to signal storage unit effected by resetting pulses supplied to the second to fifth signal storage unit by the pulse generator PG.

By the time the second signal received by the error-detecting circuit over the "signals sent" input wire S following operation of relay D is received, the first signal storage unit of the store SA has all seven of its bistable trigger circuits SA1/1 to SA7/1 in the "unset" condition, and registration of the signal in this signal storage unit proceeds in the same manner as has been described in connection with the corresponding registration of the first signal, the positive-going "start" element serving to bring about the setting of the bistable trigger circuit TCA, and so on. As long as the first signal remains stored in the sixth signal storage unit of the store SA, transfer from the fifth signal storage unit to the sixth signal storage unit of the signal registration pertaining to the second signal is inhibited by gating circuits represented functionally in the diagram by the gating circuit GA14, but otherwise this registration is quickly transferred (by resetting pulses supplied by the pulse generator PG) from signal storage unit to signal storage unit in the same manner as the signal registration pertaining to the first signal. The manner in which succeeding signals received by the error-detecting unit over its "signals sent" input wire S are entered into storage in the store SA, and are advanced from signal storage unit to signal storage unit in the store to form, as and when necessary, what is in effect a queue of registered signals in the store, will be clear without further description. As will be made clear shortly, during normal operation of the error-detecting unit and telegraph equipment with which it is associated, the sixth signal storage unit of the store SA is repeatedly being reset to its normal condition in which each of its seven bistable trigger circuits SA1/6 to SA7/6 is in the "unset" condition, and this ensures that the first signal storage unit has always been reset to its normal condition by the time it becomes necessary for a further signal received over wire S to be registered in this unit.

Referring now to signals received by the error-detecting unit over the "signals received back" input wire RB, and corresponding respectively to the previously-mentioned first, second and succeeding signals received by the error-detecting unit over the "signal sent" input wire S, these signals received over wire RB are fed to the amplifier AB1 over operated contact *d*3. The manner in which these signals received over the wire RB are entered into storage in the "signals received back" store SB corresponds exactly to that in which the signals received over the wire S are entered into storage in the store SA, the amplifiers AB1, AB2, and AB3 being amplifiers corresponding to the amplifiers AA1, AA2, and AA3 respectively, the trigger circuit TCB being a bistable trigger circuit corresponding to the trigger circuit TCA, the multivibrator MVB being one corresponding to the multivibrator MVA and having output wires MVB(I) and MVB(II) corresponding to output wires MVA(I) and MVA(II) respectively, the distributor HB being a distributor corresponding to the distributor HA, and so on. When, subsequent to the registration in the first signal storage unit of store SB of the seven elements of the first signal received over the "signals received back" input wire RB but well within the period of duration (at least 30 milliseconds) of the "stop" element of this signal, the apparatus represented functionally by the gating circuit GB9 and the slow-to-operate circuit element SLB produces an effective input condition on one input wire of the gating circuit GB10 and feeds a resetting pulse to each of the seven bistable trigger circuits of the first seven storage unit of store SB, this apparatus also produces an input condition on the input wire of the slow-to-operate circuit element SL. Consequently, shortly after the transfer (due to the feeding of a resetting pulse to each of the bistable trigger circuits SB1/1 to SB7/1 as just mentioned) to the second signal storage unit of the store SB of the signal registration pertaining to the first signal received over wire RB, the gating circuit G23 is brought to a condition in which an effective input condition exists on each of its three input wires, the effective input condition on one of these wires being due to the fact that a signal is registered in the sixth signal storage unit of store SA, the effective input condition on another of these wires being produced by the slow-to-operate circuit element SL, and the effective input condition on the remaining one of these wires being due to the fact that a signal is registered in the second signal storage unit of store SB. The gating circuit G23 accordingly produces an effective input condition on one input wire of the gating circuit G24 and feeds a resetting pulse to each of the seven bistable trigger circuits SA1/6 to SA7/6 and to each of the seven bistable trigger circuits SB1/2 to SB7/2. Such production of an effective input condition on one input wire of the gating circuit G24 is without effect when, as should normally be the case, the signal registration in the second signal storage unit of store SB at the time of such production corresponds exactly with the then existing signal registration in the sixth signal storage unit of store SA. This is because in these circumstances the condition inverter N is not, at the time of such production of an effective condition on one input wire of the gating circuit G24, producing an effective input condition on the other input wire of this gating circuit. The reason for this is that, with the condition obtaining that the signal registration in the second signal storage unit of store SB corresponds exactly with the existing signal registration in the sixth signal storage unit of store SA, each of the seven similar input circuit arrangements for the coincidence-of-seven gating circuit G22 is producing an effective input condition on the corresponding one of the seven input wires of this gating circuit, with the result that this gating circuit produces on its output wire an effective output condition that the condition inverter N inverts into what is, as regards the relevant input wire of the gating circuit G24, an ineffective input condition. The seven similar input circuit arrangements for the gating circuit G22 are arranged and controlled so that, in the case of each of them, a first one of the three constituent gating circuits (for example the gating circuit G1) produces an effective input condition on one of two input wires of a third one of these gating circuits (for example the gating circuit G3) when the condition obtains that the last bistable trigger circuits of the two storage chains to which the particular input circuit arrangement pertains (for example the bistable trigger circuits SA1/6 and SB1/2) are each in the "unset" condition, and a second one of these gating circuits (for example the gating circuit G2) produces an effective input condition on the other of the two input wires of the third one of these gating circuits when the condition obtains that said last bistable trigger circuits are each in the "set" condition, with the result that the third one of the three gating circuits produces, through the medium of the amplifier of the input circuit arrangement (for example the amplifier A1), an effective input condition on the relevant input wire of the gating circuit G22 whenever the condition obtains that said last bistable trigger circuits are in the same stable condition. Unless and until an error is detected in a signal reecived back from the distant receiving point concerned and received by the error-detecting unit over the input wire RB, comparison of successive signals registered and stored in the "signals received back" store SB with the respective corresponding signals registered and stored in the "signals sent" store SA proceeds, as regards each signal registered and stored in the store SB, in the same manner as has just been described for the first signal so stored.

When the situation arises that, at the time the gating circuit G23 produces an effective input condition on one input wire of the gating circuit G24, the signal registration in the second signal storage unit of store SB does not correspond exactly with the then existing signal registration in the sixth signal storage unit of store SA, that is when an error to be detected by the error-detecting unit has occurred, then such production of an effective input condition causes the gating circuit G24 to produce an effective input condition on a setting input wire of the monostable trigger circuit M. The resulting setting of this trigger circuit to its unstable "set" condition, in which it produces an effective output condition on its output wire M(II), brings about the operation of relay E. On operation, relay E locks up over its contact *e1* in a circuit including contact DK2 of the "Data" key. The closing of contact *e2* lights the alarm lamp L and energises the alarm bell or buzzer BE. The changing over of contact *e3* disconnects a wire SW1 from a wire SW2, and connects it instead to a wire SW3, to give a further indication that an error has been detected. The closing of contact *e4* connects a wire SW4 to a wire SW5 for effecting a controlling operation appropriate to an occasion in which an error has been detected. The opening of contact *e5* releases relay D. The falling back of contact *d2* causes the positive "spacing" condition to be continuously applied to the input wire of the amplifier AA1, with the consequence that no further setting of bistable trigger circuits of the first signal storage unit of store SA takes place for the time being. Correspondingly, the falling back of contact *d3* causes the positive "spacing" condition to be continuously applied to the input wire of the amplifier AB1, with the consequence that no further setting of bistable trigger circuits of the first signal storage unit of store SB takes place for the time being. It is arranged that the characteristics of the monostable trigger circuit M are such that this trigger circuit on being set to its unstable "set" condition remains in this condition for a holding period which is of sufficiently long duration (for example 800 milliseconds) to cover the time taken for the stores SA and SB to be completely cleared of registrations by the normal resetting action, which continues until the trigger circuit M has resumed its normal stable condition to enable the bistable trigger circuit TCA to be reset through the medium of gating circuit GA10 and to enable the bistable trigger circuit TCB to be reset through the medium of gating circuit GB10. Upon such resetting of the bistable trigger circuits TCA and TCB to the "unset" condition, the error detecting unit is in a condition in which it can again be brought into operation (to perform its error-detecting function in respect of relevant telegraph signals being transmitted) by the operation of the "Data" key DK for a brief period. In this case, the opening of contact DK2 of the key releases relay E.

It is preferred to employ transistors throughout in forming the bistable and other trigger circuits, the multivibrators, the amplifiers, and the pulse generator of the error-detecting unit.

Figure 2:
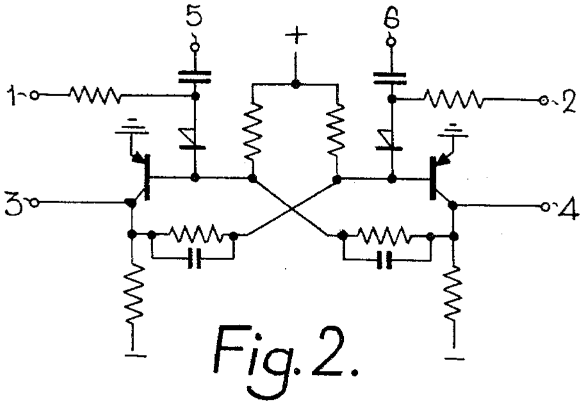

The bistable trigger circuits employed may each be of the known kind illustrated (in a general form comprising elements redundant for some applications) in FIG. 2 and employing a pair of transistors having resistive cross-coupling from the collector of each transistor of the pair to the base of the other. Assuming the normal or "unset" condition of the bistable trigger circuit of FIG. 2 to be one in which the left-hand one (as shown) of the two transistors is substantially non-conductive and the right-hand one is fully conductive, the appearance, whilst the circuit is in this "unset" condition, of an effective input condition on a setting input wire connected to terminal 3 sets the circuit to its "set" condition in which the left-hand one of the two transistors is fully conductive and the right-hand one is substantially non-conductive. The appearance, whilst the circuit is in the "unset" condition, of an effective input condition (positive-going pulse) on a setting input wire connected to terminal 6 will also set the circuit to its "set" condition provided that an inhibiting condition (relatively high negative biasing condition) is not being applied to terminal 2 at the time. The appearance, whilst the circuit is in its "set" condition, of an effective input condition (positive-going resetting pulse) on a resetting input wire connected to terminal 5 will reset the circuit to its "unset" condition provided that an inhibiting condition (relatively high negative biasing condition) is not being applied to terminal 1 at the time. Whilst the circuit is in its "unset" condition, terminal 4 is at a potential constituting an output condition, and whilst the circuit is in its "set" condition, terminal 3 is at a potential constituting an output condition.

Figure 3:
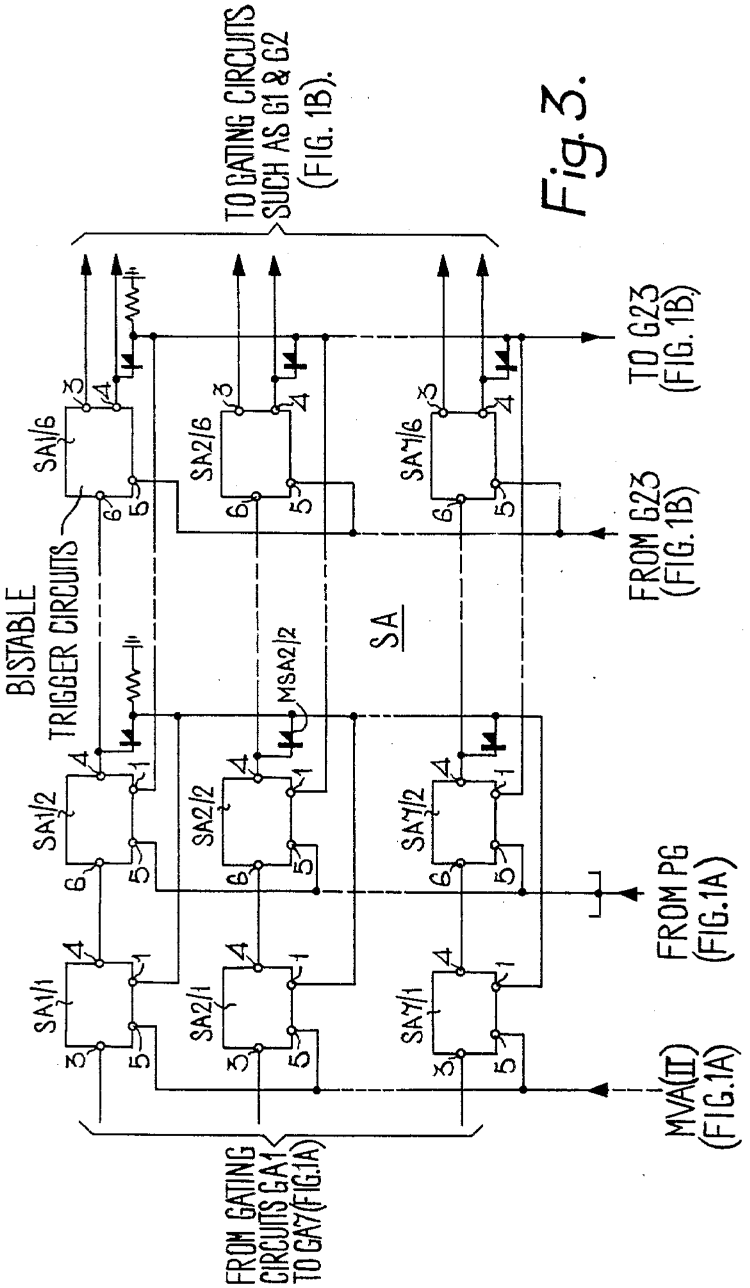

The manner in which the "signals sent" store SA may be constituted, using forty-two bistable trigger circuits of the form illustrated in FIG. 2, is shown in FIG. 3. In order to avoid unnecessary repetition in the drawing, only the nine typical bistable trigger circuits SA1/1, SA1/2, SA1/6, SA2/1, SA2/2, SA2/6, SA7/1, SA7/2 and SA7/6 are actually represented in FIG. 3. The terminals designated 1, 3, 4, 5 and 6 in FIG. 3 correspond, of course, in the case of each bistable trigger circuit, to terminals 1, 3, 4, 5, and 6 respectively of FIG. 2. With the exception of the seven bistable trigger circuits SA1/1, SA2/1, SA3/1 . . . SA7/1, each of the bistable trigger circuits in FIG. 3 would have its terminal 2 (see FIG. 2) connected to earth internally. The inhibiting function that is shown functionally in FIG. 1A as being performed by gating circuits GA9, GA11, GA12, GA13, and GA14 is provided for in the form of "signals sent" store illustrated in FIG. 3, by the interconnections made between, on the one hand, the terminals 1 of the bistable trigger circuits of each column of bistable trigger circuits except the last (or sixth) column, and, on the other hand, the terminals 4 of the bistable trigger circuits of the next succeeding column. If, for example, bistable trigger circuit SA2/2 of the second column of bistable trigger circuits is in the "set" condition, terminal 4 of this trigger circuit will be at a relatively high negative potential, and accordingly, owing to the fact that this terminal 4 is coupled, by way of rectifier MSA2/2, to the terminals 1 of the seven bistable trigger circuits SA1/1, SA2/1, SA3/1 . . . SA7/1, an effective inhibiting condition will be applied to these terminals 1, the resetting of any bistable trigger circuit of the first column being thereby inhibited.

The "signals received back" store SB may be constituted in a corresponding manner, using fourteen bistable trigger circuits of the form illustrated in FIG. 2.

Figures 4, 5:
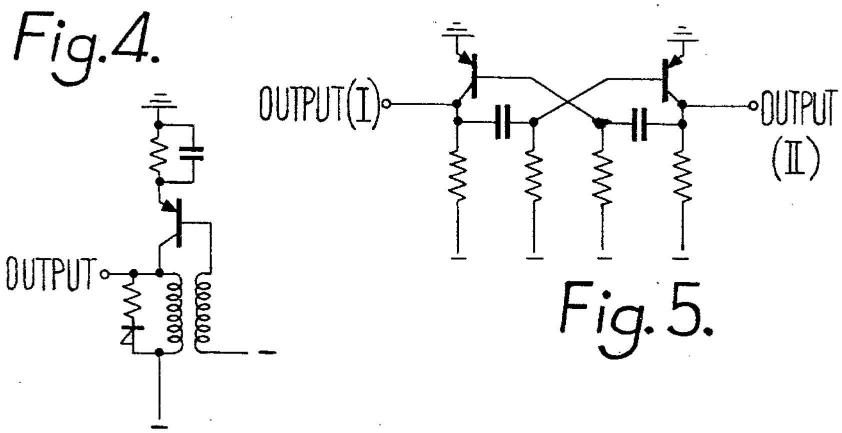

The pulse generator PG may be a free-running blocking oscillator of the known kind illustrated in FIG. 4 and employing a single transistor, or it may be a multivibrator of the known kind illustrated in FIG. 5 and comprising two transistors, one output terminal of the multivibrator being connected to the single utilisation circuit involved in this instance.

The multivibrators MVA and MVB may each be of the known kind illustrated in FIG. 5.

Figure 6:
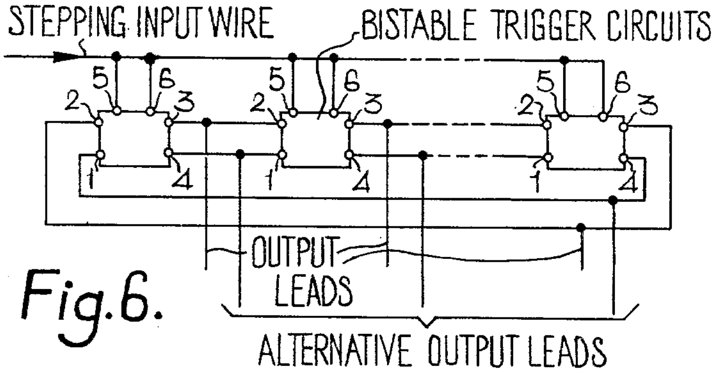

As already stated, each of the distributors HA and HB is ocnstituted by a ring of seven bistable trigger circuits. The manner in which such a ring may be constituted, using bistable trigger circuits of the form illustrated in FIG. 2, is shown in FIG. 6, the order in which the constituent bistable trigger circuits shown are caused to be in the "set" condition, one at a time only, during stepping being from left to right in the figure. Suitable guard circuits may be provided, in conjunction with each such ring, to ensure that the condition in which one, but not more than one, of the constituent bistable trigger circuits of the ring in the "set" condition is maintained.

Gating circuits of the well-known diode (rectifier) resistor types may be employed.

The amplifiers may be simple transistor amplifiers, and the condition inverter N may be constituted by such an amplifier.

What I claim is:

In a signal transmission system wherein a transmitting point from which multi-element signals are sent to a distant receiving point receives back from said distant receiving point multi-element signals that in the absence of error in signal transmission, should be identical, so far as signal significance is concerned, with the respective corresponding ones of said signals sent from said transmitting point, a signal-transmission-error detecting arrangement situated at said transmitting point and comprising, in combination:

(a) a first input circuit feeding into the arrangement multi-element signals that correspond to said signals sent from said transmitting point, (b) a second input circuit feeding into the arrangement said multi-element signals that said transmitting point receives back from said distant receiving point, (c) a signal store associated with said first input circuit and comprising a plurality of storage chains that are operative in combination, each said storage chain consisting of a like number of serially connected storage elements, and a plurality of groups of storage elements with each group comprising one corresponding storage element from each storage chain of the store so as to constitute a signal storage unit for storing the elements of a multi-element signal as a pattern of set and unset storage elements, (d) means for inserting signal elements that the arrangement receives over said first input circuit, and that constitute a multi-element signal, as a pattern into said signal store at one end thereof, (e) means for causing the elements of a multi-element signal that have been inserted as a pattern into said signal store at said one end thereof to be progressed as a whole along this store to the other end thereof, (f) means for inhibiting the progression of the elements of a multi-element signal along said signal store when such inhibition is necessary to provide for the formation of a sequence of stored multi-element signals in said signal store, (g) means comprising a plurality of coincidence-of-two-gating circuits for comparing the elements of a multi-element signal that have become stored as a pattern at said other end of said signal store and the elements of the corresponding multi-element signal that the arrangement receives over said second input circuit, said comparison means having further means for signifying the identicalness of two multi-element signals so compared by its attainment of a condition in which an appropriate combination of said gating circuits are producing an effective output, (h) means controlled by said comparison means for giving a signal in response to the failure of said comparison means to attain, in respect of two multi-element signals compared by it, a condition significant of the identicalness of the two signals, whereby the occurrence of a signal transmission error is signified, (i) means for causing the elements of a multi-element signal that have become stored as a pattern at said other end of said signal store to be finally removed from storage in this store, (j) a further signal store associated with said second input circuit and comprising a plurality of storage chains that are operative in combination, each said storage chain consisting of a like number of serially connected storage elements, and a plurality of groups of storage elements with each group comprising one corresponding storage element from each storage chain of the store so as to constitute a signal storage unit for storing the elements of a multi-element signal as a pattern of set and unset storage elements, (k) means for inserting signal elements that the arrangement receives over said second input circuit, and that constitute a multi-element signal as a pattern into said further signal store at one end thereof, (l) means for causing the elements of a multi-element signal that have been inserted as a pattern into said further signal store at said one end thereof to be progressed as a whole to the other end of this store for storage at this other end while the requisite comparison between them and the elements of the corresponding multi-element signal stored in said signal store associated with said first input circuit is effected by said comparison means, and (m) means for causing the elements of a multi-element signal that have become stored as a pattern at said other end of said further signal store to be finally removed from storage in this store.

References Cited by the Examiner

UNITED STATES PATENTS

| | | | |
|---|---|---|---|
| 2,121,163 | 6/1938 | Robinson | 178—23.1 |
| 2,740,106 | 3/1956 | Phelps | 340—146.1 X |

ROBERT C. BAILEY, *Primary Examiner.*

ROBERT H. ROSE, *Examiner.*

A. J. DUNN, M. P. ALLEN, *Assistant Examiners.*